United States Patent
Malden et al.

(10) Patent No.: US 8,276,086 B2
(45) Date of Patent: Sep. 25, 2012

(54) METHOD AND SYSTEM FOR VISUAL LANDING PAGE OPTIMIZATION CONFIGURATION AND IMPLEMENTATION

(75) Inventors: Matthew Scott Malden, San Mateo, CA (US); John S. Jacob, El Cerrito, CA (US)

(73) Assignee: Autonomy, Inc., San Francisco, CA (US)

( * ) Notice: Subject to any disclaimer, the term of this patent is extended or adjusted under 35 U.S.C. 154(b) by 458 days.

(21) Appl. No.: 12/540,981

(22) Filed: Aug. 13, 2009

(65) Prior Publication Data

US 2010/0042935 A1   Feb. 18, 2010

Related U.S. Application Data

(60) Provisional application No. 61/088,966, filed on Aug. 14, 2008.

(51) Int. Cl.
   *G06F 3/048* (2006.01)
(52) U.S. Cl. .................. 715/763; 715/765; 715/781
(58) Field of Classification Search .................. 715/700, 715/744, 760, 763, 764, 765, 234, 733, 762, 715/769, 781; 707/802, 803, 805
   See application file for complete search history.

(56) References Cited

U.S. PATENT DOCUMENTS

| | | | |
|---|---|---|---|
| 7,577,643 B2 | 8/2009 | Dominowska et al. | |
| 2002/0194166 A1 | 12/2002 | Fowler | |
| 2004/0107137 A1 | 6/2004 | Skinner | |
| 2005/0060168 A1 | 3/2005 | Murashige et al. | |
| 2005/0165600 A1 | 7/2005 | Kasravi et al. | |
| 2005/0283357 A1 | 12/2005 | MacLennan et al. | |
| 2006/0074749 A1 | 4/2006 | Kline et al. | |
| 2007/0027850 A1 | 2/2007 | Chan et al. | |
| 2007/0143266 A1* | 6/2007 | Tang et al. | 707/3 |
| 2007/0156757 A1 | 7/2007 | Tang et al. | |
| 2007/0271511 A1* | 11/2007 | Khopkar et al. | 715/540 |
| 2008/0028010 A1 | 1/2008 | Ramsey | |
| 2008/0071766 A1 | 3/2008 | Grieselhuber et al. | |
| 2008/0082400 A1 | 4/2008 | Martel et al. | |
| 2008/0172374 A1 | 7/2008 | Wolosin | |
| 2008/0270223 A1 | 10/2008 | Collins et al. | |
| 2008/0270452 A1* | 10/2008 | Goldman | 707/102 |
| 2009/0006311 A1 | 1/2009 | Ting et al. | |
| 2009/0094137 A1* | 4/2009 | Toppenberg et al. | 705/27 |
| 2009/0132524 A1 | 5/2009 | Stouffer et al. | |
| 2010/0042495 A1 | 2/2010 | Malden | |
| 2010/0042613 A1 | 2/2010 | Malden | |
| 2010/0042635 A1* | 2/2010 | Venkataramanujam | 707/100 |
| 2010/0169312 A1 | 7/2010 | Malden | |
| 2010/0169356 A1 | 7/2010 | Malden | |
| 2010/0185661 A1 | 7/2010 | Malden | |

OTHER PUBLICATIONS

U.S. Appl. No. 12/479,711, Non-Final Office Action mailed Jul. 6, 2011.
U.S. Appl. No. 12/577,703, Non-Final Office Action mailed Apr. 15, 2011.
"New Email Marketing Features in List Manager," Lyris, Inc., 4 pages, printed Aug. 11, 2009, available online at http://www.lyris.com/solutions/listmanager/whats-new/.
U.S. Appl. No. 12/346,589, Non-Final Office Action mailed Aug. 6, 2010.

(Continued)

*Primary Examiner* — Xiomar L Bautista

(57) ABSTRACT

Systems, methods, and computer program products provide a utility to an administrator computer used by an administrator for visually configuring an optimization experiment on a landing page. The landing page selected by the administrator is read. The landing page is processed to allow the administrator to configure the optimization experiment without writing code.

35 Claims, 12 Drawing Sheets

OTHER PUBLICATIONS

U.S. Appl. No. 12/414,171, Non-Final Office Action mailed Aug. 31, 2010.
U.S. Appl. No. 12/577,703, Final Office Action mailed Jan. 5, 2011.
U.S. Appl. No. 12/577,703, Non-Final Office Action mailed Jul. 20, 2010.
U.S. Appl. No. 12/479,711, Final Office Action mailed Feb. 9, 2012.
U.S. Appl. No. 12/541,028, Non-Final Office Action, mailed Oct. 28, 2011.
U.S. Appl. No. 12/577,703, Final Office Action mailed Dec. 16, 2011.

* cited by examiner

METHOD AND SYSTEM FOR VISUAL LANDING PAGE OPTIMIZATION CONFIGURATION AND IMPLEMENTATION

CROSS-REFERENCE TO RELATED APPLICATIONS

This application claims priority to provisional U.S. Patent Application Ser. No. 61/088,966, filed on Aug. 14, 2008 and entitled "Method and System for Optimization, Automation, and Administration," the disclosure of which is hereby incorporated herein by reference.

FIELD OF THE INVENTION

The present application relates to Internet web page design and, in particular, a system and method for utilizing a visual user interface for configuring and implementing landing page optimization experiments.

BACKGROUND

Many persons use the Internet to research products and services, as well as to make purchases. Users may use a web browser to navigate to a web site by clicking on a hyperlink on a search engine results page, a third-party web site, an email newsletter, a web-based display advertisement as well as on other sources. Users may also type in the web address of the desired website directly into a web browser. The user may be directed to the top level domain (TLD) of the destination web site or to any other page of the web site, together commonly referred to as "landing pages".

Some landing pages are standard web pages that display information to the user and allow them to easily navigate to other locations on the web site for more information. The goal of the web site is for the user to perform a specific action, on the landing page or on another web page, which might be to purchase a product, subscribe to a newsletter, request a sales call, etc. When a user performs the desired action, it is commonly referred to as a "conversion". Other times, landing pages are highly focused web pages that provide minimal, if any, opportunity to navigate away from the landing page. This design is to motivate the user to immediately perform a specific desired action, which is commonly referred to as a "conversion".

Many factors influence whether a user arriving on a landing page converts or not. Those factors include the content of the landing page, the title of the landing page, the header text on the landing page, the offer on the landing page, the graphical elements on the landing page, the layout of the landing page, the fonts and colors used in each aspect of the landing page and a variety of other factors. The area of experimentation with each of these factors on a landing page to increase the rate of generating conversions is commonly known as landing page optimization.

SUMMARY

In one embodiment, a system and method provide a utility to an administrator computer used by an administrator for visually configuring an optimization experiment on a landing page. The landing page selected by the administrator is read. The landing page is processed to allow the administrator to configure the optimization experiment without writing code.

Many other features and embodiments of the present invention will be apparent from the accompanying drawings and from the following detailed description.

BRIEF DESCRIPTION OF THE DRAWINGS

The present disclosure is illustrated by way of example and not limited in the figures of the accompanying drawings in which like references indicate similar elements.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In some instances, structures and devices are shown in block diagram form in order to avoid obscuring the description. In other instances, functional block diagrams are shown to represent data and logic flows.

Reference in this specification to "one embodiment," "an embodiment," "other embodiments," or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments.

Moreover, whether or not there is express reference to an "embodiment" or the like, various features are described which may be variously combined and included in some embodiments but also variously omitted in other embodiments. Similarly, various requirements are described which may be requirements for some embodiments but not other embodiments.

The present invention is systems and methods of utilizing a visual user interface for configuring landing page optimization experiments. The present invention includes systems and methods for publishing and implementing landing page optimization experiments. The present invention further includes systems and methods for running landing page optimization experiments. In one embodiment, an experiment is a series of different views of a landing page to determine which view results in the most conversions. The different views display different pieces of content on the landing page. Experiments on the landing page can be visually configured and published by an administrator of the landing page by simple "point and click" commands without the need to write code. As used herein, visual configuration and publication, and the like, means configuration by simple commands to and manipulation of a visual graphical user interface, and visual elements thereof, including, for example, by "point and click," "drag and drop," and other techniques without the need to write code.

Figure 1:
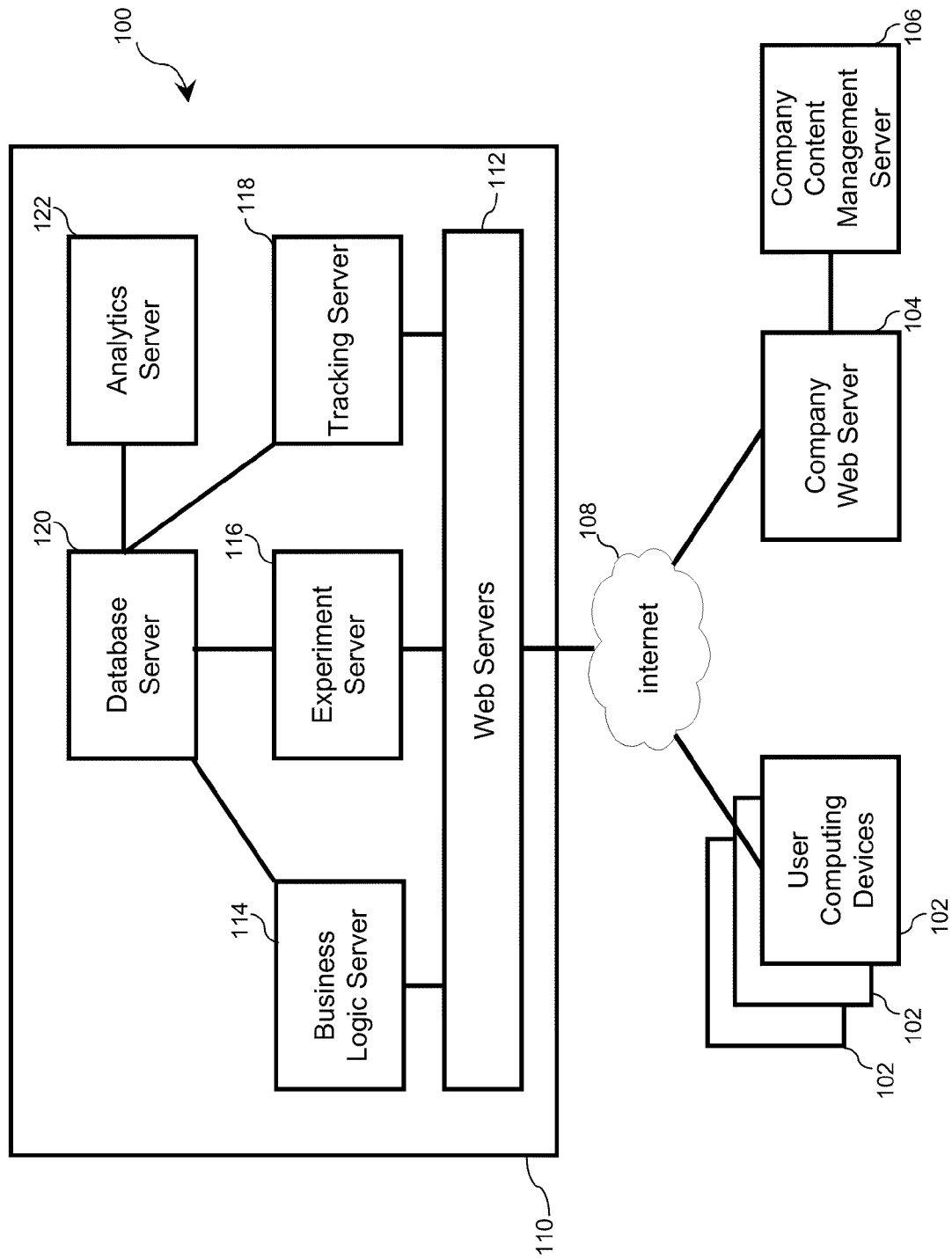
FIG. 1 illustrates a system to utilize a visual user interface to configure and implement landing page optimization experiments in accordance with one embodiment of the present invention.

FIG. 1 illustrates a system 100 of utilizing a visual user interface for visually configuring and implementing landing page optimization experiments. In one embodiment, the present invention can be used in connection with a variety of landing pages. In another embodiment, the present invention can be used in connection with a variety of content management systems that track and manage landing pages.

The system 100 includes user computing devices 102, internet 108, a company web server 104, a company content management server 106, and a platform 110. The platform 110 includes web servers 112, a business logic server 114, an experiment server 116, a tracking server 118, a database server 120 and an analytics server 122. An administrator can access the internet 108 via user computing devices 102 and use the functionality of the platform 110. The administrator can specify and configure landing pages to be optimized. These configurations are routed through the web servers 112 to the business logic server 114 and stored in the database server 120. An end user can access the company web server 104 through the internet 108 via user computing devices 102. The company web server 104 serves landing pages, some of which may be based on content stored in the company content management server 106. When landing pages retrieved from the company web server 104 are rendered in web browsers on user computing devices 102, a web browser of the user computing device 102 retrieves variations of the landing page from the experiment server 116 based on statistical data stored in the database server 120. In one embodiment, statistical data includes information that is collected regarding the version of a particular landing page that has been viewed and the person who viewed the version. In one embodiment, the statistical data also includes information such as each version of the landing page and its corresponding content, impressions, conversions, conversion rate and other statistics.

The landing page may have tracking code that sends information about the end user and the landing page viewed by the end user through the internet 108 and the web servers 112 to the tracking server 118 which stores the information (i.e., tracking data) in the database server 120. In one embodiment, tracking data can include, for example, information about the end user, information about the user computer device 102 used by the end user, keywords entered into a search engine by the end user, the previous web page from which the end user navigated, the type of browser running on the user computer device 102, the operating system of the user computer device, etc. The analytics server 122 processes and aggregates the tracking data stored in the database server 120 by the tracking server 118 and stores it in the database server 120. The analytics server 122 also processes and aggregates the statistical data stored in the database server 120 by the experiment server 116, as discussed below, and stores it in the database server 120.

Figure 2:
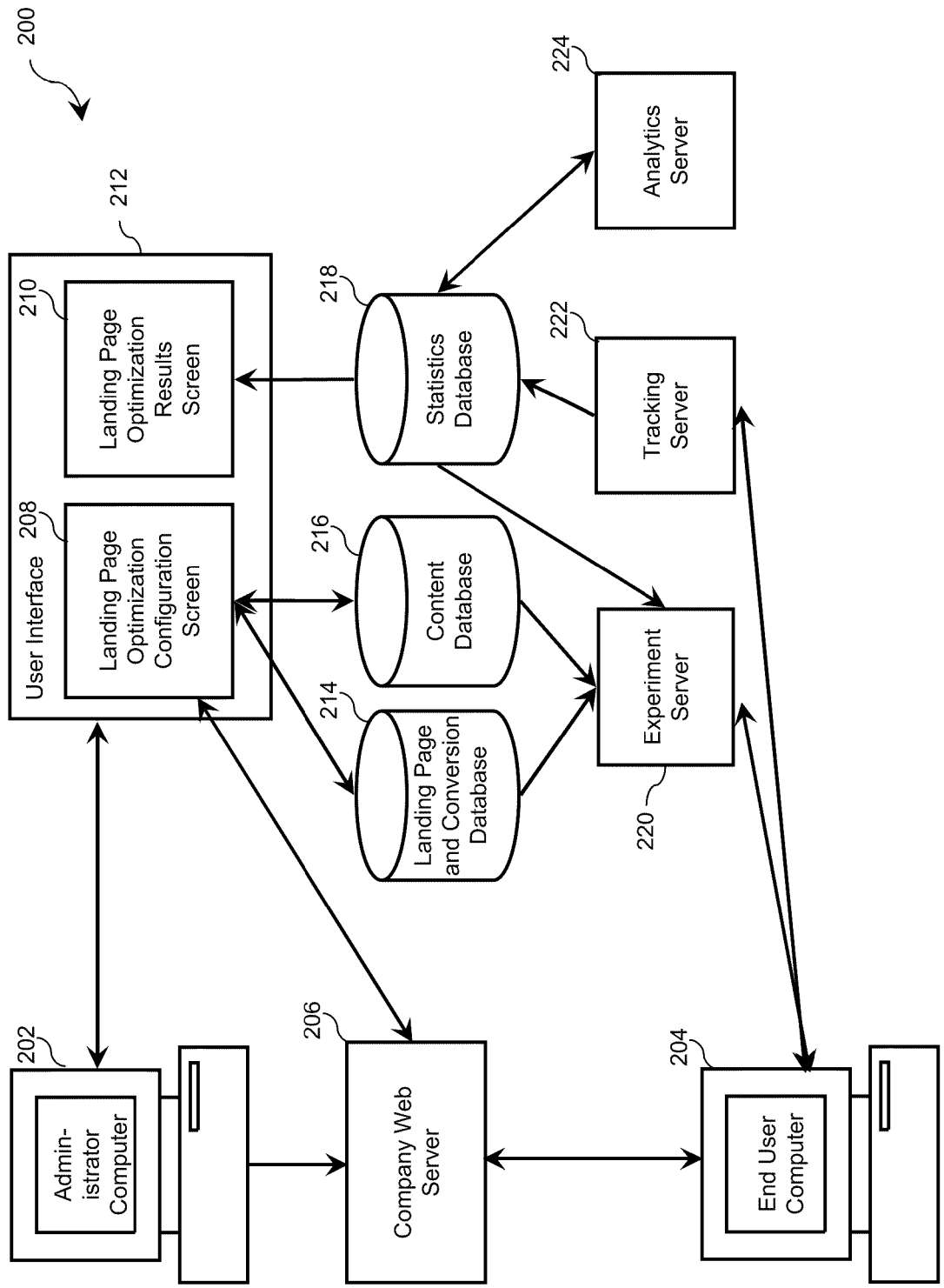
FIG. 2 illustrates a system of utilizing a visual user interface to configure and implement landing page optimization experiments in accordance with one embodiment of the present invention.

FIG. 2 illustrates a system of utilizing a visual user interface for visually configuring and implementing landing page optimization experiments in accordance with one embodiment of the present invention. The system 200 includes an administrator computer 202, an end user computer 204, a company web server 206, a landing page optimization configuration screen 208, a landing page optimization results screen 210, a user interface 212 displayed on the administrator computer 202, a landing page and conversion database 214, a content database 216, a statistics database 218, an experiment server 220, a tracking server 222, and an analytics server 224.

In one embodiment, the administrator computer 202 and the end user computer 204 are included in the user computing devices 102. In one embodiment, the company web server is the company web server 104. In one embodiment, the landing page and conversion database 214, the content database 216 and the statistics database 218 are included in the database server 120. In one embodiment the experiment server 220 is the experiment server 116. In one embodiment, the tracking server 222 is the tracking server 118. In one embodiment, the analytics server 224 is the analytics server 122.

Using the administrator computer 202, an administrator can specify one or more landing pages to be optimized using the landing page optimization configuration screen 208 which is part of the user interface 212 of the administrator computer 202. References (e.g., URLs, pointers, etc.) to the landing pages are stored in the landing page and conversion database 214. The administrator then uses the landing page optimization configuration screen 208 which reads the landing page from the company web server 206 and configures an experiment, as described in more detail below. In one embodiment, the landing page is read directly from the company content management server 106. The configuration and associated content for the landing page is then stored in the content database 216. The administrator defines which web page navigations or gestures represent a "conversion" and those navigations and gestures are stored in the landing page and conversion database 214.

The administrator also places tracking code on each web page on the company web server 206 or content management server 106 to return landing page and user tracking information as web pages, some of which are landing pages, are retrieved by end users.

Using the end user computer 204, a user navigates to a landing page on the company web site which is served by the company web server 206. When the landing page is rendered by the web browser on the end user computer 204, the web browser requests content from the experiment server 220. The experiment server 220 determines which content to display for each region (or visual element) of the landing page being tested based on the statistical data in the statistics database 218.

The content is retrieved from the content database 216 and sent to the web browser on the end user computer 204 and rendered at the same time as the landing page originally retrieved from the company web server 206 is displayed. The web browser on the end user computer 204 also executes the tracking code and sends information on the landing page and user to the tracking server 222.

The analytics server 224 processes and aggregates the statistical data in the statistics database 218. Based on the statistical data, the experiment server 220 determines which versions of content are most effective at driving conversions and displays those versions more frequently on future views of the landing page. In one embodiment, the experiment may be based on different mathematical algorithms, which may include multivariate testing using the "Design of Experiments" method. In one embodiment, the experiment server 220 evaluates the correlation effects that different pieces of content have on conversion rate when used in concert with each other.

The landing page optimization results screen 210 reads data from the statistics database 218 and enables the administrator on the administrator computer 202 to view the results of the experiment including each version of the page and its corresponding content, impressions, conversions, conversion rate and other statistics. The administrator can, for each piece of content on the page, view its corresponding impressions, conversions, conversion rate and other statistics.

Figure 3:
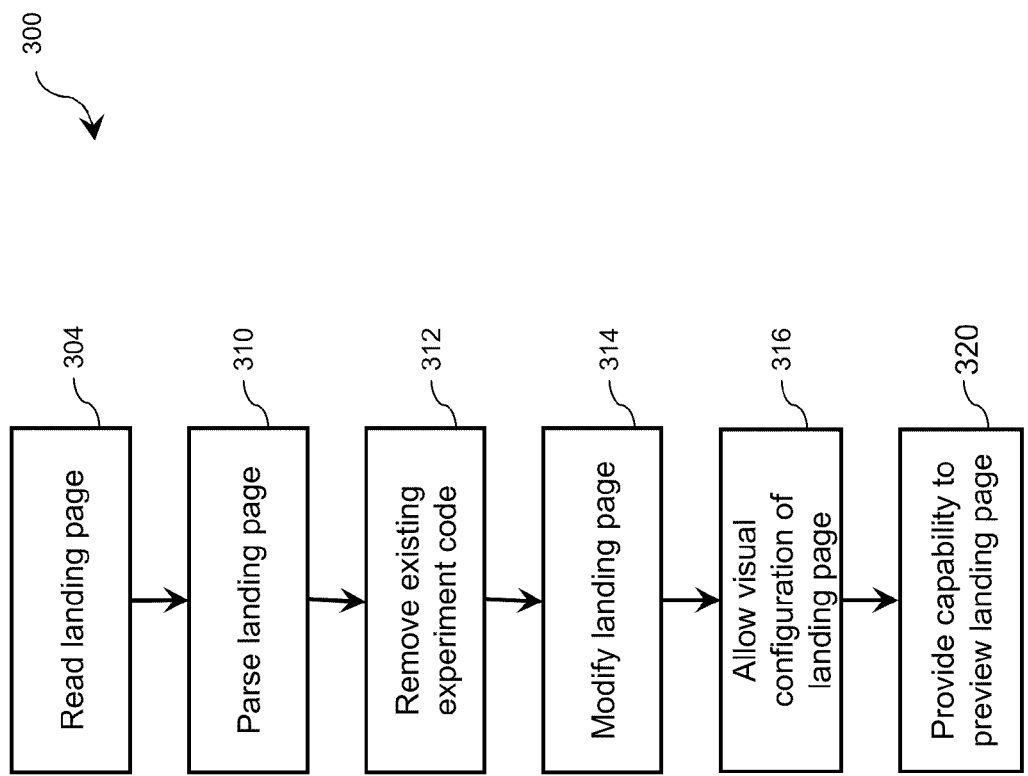
FIG. 3 illustrates a method of using a user interface to configure a landing page optimization experiment in accordance with one embodiment of the present invention.

FIG. 3 illustrates a functional block diagram and method 300 for using a visual user interface to visually configure a landing page optimization experiment. The method 300 includes read landing page block 304, parse landing page block 310, remove existing experiment code block 312, modify landing page block 314, allow visual configuration of the landing page block 316, and provide functionality to preview landing pages block 320.

The administrator can use the administrator computer 202 to configure the landing page optimization experiment. The administrator specifies an existing or new landing page to configure. In one embodiment, the read landing page block 304 reads the landing page from either the company web server 104 or the company content management server 106. In another embodiment, the landing page is uploaded directly by the administrator and stored in the content database 216. The landing page is then passed to the parse landing page block 310.

The parse landing page block 310 parses the code of the landing page. Where applicable, the code is modified to standardize the code without changing the intended appearance and behavior of the landing page. For example, any syntax errors in the code are remedied. In one embodiment, modifications include adding a DOCTYPE element and removing duplicate HEAD or BODY tags. In one embodiment, the landing page may consist of HTML code, PHP code, ASP code, JSP code and/or other types of landing page code. The landing page is then passed to the remove existing experiment code block 312.

The remove existing experiment code block 312 removes any experiment code that was previously added to the landing page for a current or prior experiment. In one embodiment, experiment code is identified by a standard naming convention used by the system to generate experiment code. The standard naming convention is used to distinguish the experiment code from the code associated with the landing page. The landing page is then passed to the modify landing page block 314.

The modify landing page block 314 modifies the landing page in-place to enable visual manipulation. These modifications may include: (1) generating and inserting HTML element ids; (2) inserting HTML elements around selected HTML elements; (3) inserting a "BASE HREF" HTML element; (4) inserting code to support visual manipulation; and (5) inserting code to execute the experiment.

Unique element ids are generated for each visible element of the landing page. In one embodiment, visible elements are identified by the following tags: "div", "p", "img", "h1", "h2", "h3", "h4", "h5", "h6", "span", "td", "th", "li", "ul", "ol", "dl", "dt", "dd". In one embodiment, element ids are generated using an algorithm that will generate the same element ids given the same landing page input or visible element. In one embodiment, any existing id tags are used for visible elements. In one embodiment, a standard naming convention is used to generate element ids to allow the system to recognize system generated element ids for later processing. Using HTML tags, these generated element ids are inserted into the landing pages. These tags, also known as "wrapping," provide a stable target for content swapping in accordance with an experiment.

A "BASE HREF" HTML element can be added if none exists to provide the base path for all relative URLs (i.e., URLs without a leading "http:// . . . " or equivalent).

Code is then inserted to support visual manipulation by the administrator. In one embodiment, the code to support visual manipulation includes CSS and JavaScript.

Code is then inserted to execute the experiment when the landing page is rendered. In one embodiment, the code includes JavaScript. The modified landing page is then passed to the allow visual configuration of landing page block 316.

In the allow visual configuration of the landing page block 316, the administrator is provided the ability to use the administrator computer 302 to configure a landing page optimization experiment. Any configuration previously done on the landing page, if any, is retrieved and the modified landing page with the previous configuration, if any, is rendered intact. The modified landing page with the element ids and code is displayed to the administrator in a graphical user interface.

In the allow visual configuration of the landing page block 316, the administrator can select the regions of the landing page (i.e., visual elements) on which to experiment using different variations of content. In one embodiment, the regions can include text, headlines, graphics, landing page title and other visual elements. The landing page is displayed in read-only mode. The administrator can select the regions using a mouse or pointer. In one embodiment, each visual element is identified when the mouse or pointer hovers over it by a dotted outlined rectangle indicating its availability for selection. The administrator clicks on any region to select or unselect it. Selected elements have a different visual appearance than non-selected elements. In one embodiment, selected regions are indicated by a solid outlined rectangle. In one embodiment, the indicator specifying availability for selection or selected regions can be any type of polygon. Web page navigation is disabled when a hyperlink is selected. The administrator can select an unlimited number of regions.

In the allow visual configuration of the landing page block 316, the administrator can also setup content to be used for each of the regions defined, as discussed above. In one embodiment, the same screen (or screens) can be used to allow selection of the regions and setup of content for the regions. In one embodiment, one screen (or screens) can be used for selection of the regions while another screen (or screens) can be used for set up of content for the regions. Selected regions have a different visual appearance than regions not selected. The administrator can configure each region using the mouse or pointer. Regions with the cursor hovering over them have a different visual appearance than elements without the cursor hovering over them. In one embodiment, selected regions are indicated by a solid outlined rectangle. In one embodiment, regions with the cursor hovering over them have a different visual appearance than regions without the cursor hovering over them. In one embodiment, regions with the cursor hovering over them are indicated by a dotted outlined rectangle. The administrator clicks on a region to configure it. In one embodiment, when configuring a region, a pop-up window is displayed showing the original content for that region as well as pre-configured variations of content for that region. The administrator can specify, delete, enable and disable pieces of content to test in the experiment. In one embodiment, content variations are specified by typing text or a URL for an image. In another embodiment content variations are specified by selecting files using drag and drop from a local hard drive or file server. In one embodiment, the original content is preserved as a variation that cannot be deleted. The administrator can specify an unlimited number of pieces of content for each region.

Optimization experiment configurations for a landing page that are specified by the administrator can be stored in the content database 216.

In the preview landing pages block 320, the administrator is provided the capability to preview one or more dynamically created variations of the landing pages simulating the pages that will be rendered to an end user to validate that the dynamically created landing pages are acceptable. In one embodiment, the system allows the administrator to view a minimum number of versions of the landing page with each piece of content displayed in at least one version.

In one embodiment, the read landing page block 304, the parse landing page block 310, the remove existing experiment code block 312, the modify landing page block 314, the allow visual configuration of the landing page block 316 and the provide capability to preview landing pages block 320 are performed by the platform 110. In one embodiment, some of these blocks are performed by the platform 110.

Figure 4:
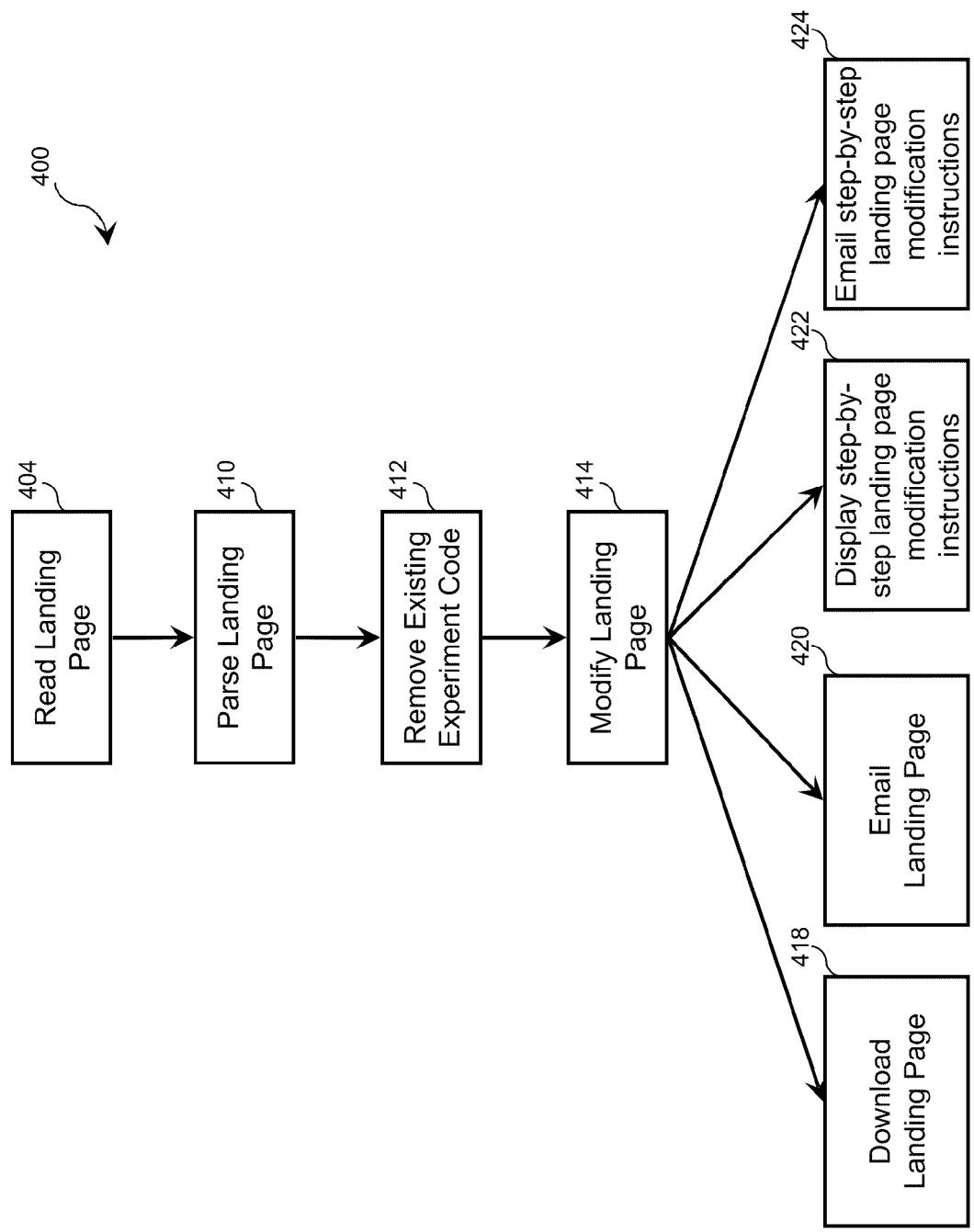
FIG. 4 illustrates a method of publishing landing pages enabled with landing page optimization experiments in accordance with one embodiment of the present invention.

FIG. 4 illustrates a functional block diagram and method 400 for publishing landing pages enabled with landing page optimization experiments. The method 400 includes a read landing page block 404, a parse landing page block 410, a remove existing experiment code block 412, a modify landing page block 414, a download landing page block 418, an email landing page block 420, a display step-by-step landing page modification instructions block 422, and an email step-by-step landing page modification instructions 424.

In one embodiment, the read landing page block 404, the parse landing page block 410, the remove existing experiment code block 412, and the modify landing page block 414 function in a manner similar to, respectively, the read landing page block 304, the parse landing page block 310, the remove existing experiment code block 312, and the modify landing page block 314. In one embodiment, the read landing page block 404, the parse landing page block 410, the remove existing experiment code block 412, and the modify landing page block 414 are performed to account for any changes made to the landing page after the configuration of the landing page optimization experiment, as discussed above.

The administrator selects one or more of four methods of publishing the web page represented by the download landing page block 418, the email landing page block 420, the display step-by-step landing page modification instructions block 422 and the email step-by-step landing page modification instructions block 424. In one embodiment, the landing page may be published directly to the company web server 104 or company content management server 106.

In the download landing page block 418, a version of the landing page with the landing page optimization experiment code and tags configured into it is generated. The user can cause the version of the landing page to be downloaded and copied to the company web server 104 or company content management server 106.

In the email landing page block 420, a version of the landing page with the landing page optimization experiment code and tags configured into it is generated. The administrator then specifies an email address of a recipient who can publish the landing page. A version of the landing page is emailed as an attachment to the recipient with instructions on copying the landing page to the company web server 104 or company content management server 106. In one embodiment, the tracking code is then inserted. In one embodiment, the tracking code consists of JavaScript.

In the display step-by-step landing page modification instructions block 422, easy-to-use, step-by-step instructions to manually modify the existing landing page to implement the landing page optimization experiment are generated. In one embodiment, the step-by-step instructions allow implementing a landing page optimization experiment on dynamically created pages and pages with server side processing, such as PHP. In one embodiment, the step-by-step instructions use a copy and paste metaphor. The administrator can follow the instructions by appropriately copying and pasting information into the landing page to modify the landing page on the company web server 104 or company content management server 106 to implement the experiment.

In the email step-by-step landing page modification instructions block 424, easy-to-use, step-by-step instructions to manually modify the landing page to implement the landing page optimization experiment are generated. In one embodiment, the step-by-step instructions allow implementing a landing page optimization experiment on dynamically created pages and pages with server side processing, such as PHP. In one embodiment, the step-by-step instructions use a copy and paste metaphor. The administrator then specifies an email address of a recipient who can implement the instructions. The instructions are emailed to a recipient to modify the landing page on the company web server 104 or company content management server 106 to implement the experiment.

Once the landing page optimization experiment has been implemented by publication of the landing page, the administrator can select an enable button (not shown) on the user interface 212 to commence the landing page optimization experiment. The administrator can also disable the experiment at any time by selecting a disable button (not shown). In one embodiment, by selecting the enable button and the disable button, the administrator can control the experiment server 220 in generating or not generating variations of the landing page.

In one embodiment, the read landing page block 404, the parse landing page block 410, the remove existing experiment code block 412, the modify landing page block 414, the download landing page 418, the email landing page 420, the display step-by-step landing page modification instructions 422, and the email step-by-step landing page modifications instructions are performed by the platform 110. In one embodiment, some of these blocks are performed by the platform 110.

Figure 4A:
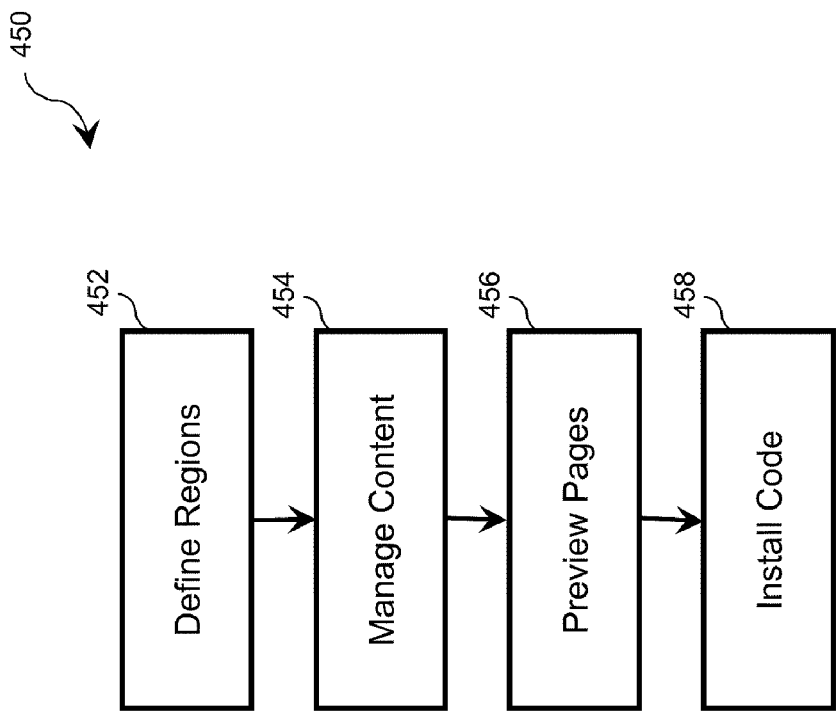
FIG. 4A illustrates a method of a wizard for configuring and publishing a landing page in accordance with one embodiment of the present invention.

FIG. 4A shows a method 450 to navigate through a series of guided steps ("workflow") to set up landing page optimization that include Define Regions block 452, a Manage Content block 454, a Preview Pages block 456, and a Install Codeblock 458.

In one embodiment, the Define Regions block 452, the Manage Content block 454, the Preview Pages block 456, and the Install Code block 458 can be implemented in a step-by-step wizard displaying a series of screens on the administrator computer 302.

In one embodiment, the screens of the wizard and the functionality provided by the wizard are served from and performed by the platform 110 to the administrator computer 202.

In one embodiment, the Define Regions block 452, the Manage Content block 454, the Preview Pages block 456, and the Install Code block 458 do not require coding by the administrator or on the side of the administrator computer 202. Rather, the administrator need only provide simple commands to and manipulation of a visual graphical user interface, and visual elements thereof, including, for example, by "point and click," "drag and drop," and other techniques without the need to write code.

In one embodiment, as discussed above in connection with FIGS. 3 and 4, the landing page is processed by the platform 110 so that the administrator can use the administrator computer 302 to configure and publish a landing page optimization experiment without the need to write software or otherwise perform coding-related tasks.

In the Define Regions block 452, the administrator can select the visual elements, called regions, of the landing page on which to experiment by using different variations of content for each region, as described above in connection with the allow visual configuration of the landing page block 316. In the Manage Content block 454, the administrator can also setup the content to be used for each of the selected regions, as described above in connection with the allow visual configuration of the landing page block 316. In the Preview Pages block 456, the administrator can preview one or more dynamically created variations of the landing pages simulating the pages that will be rendered to an end user to validate that the dynamically created landing pages are acceptable, as described above in connection with the providing capability to preview landing pages block 320. In the Install Code block 458, the administrator selects one or more of four methods of publishing the web page, as described above in connection with the download landing page block 418, the email landing page block 420, the display step-by-step landing page modification instructions block 422, and the email step-by-step landing page modification instructions block 424.

Figure 5:
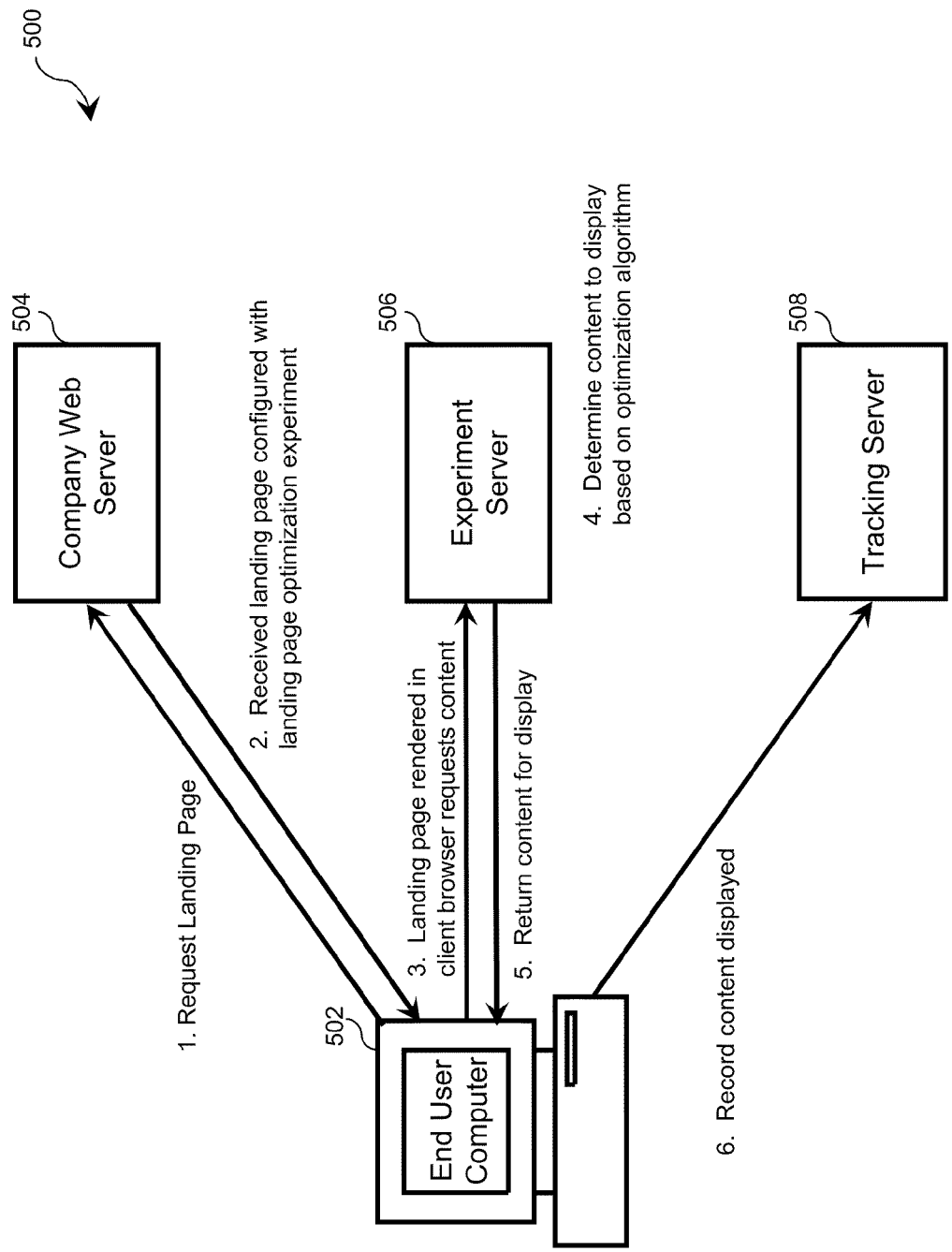
FIG. 5 illustrates a method of executing a landing page optimization experiment in accordance with one embodiment of the present invention.

FIG. 5 illustrates a functional block diagram and method 500 for executing a landing page optimization experiment. The method 500 includes an end user computer 502, a company web server 504, an experiment server 506, and a tracking server 508. In one embodiment, the end user computer 502 is the user computing device 102, the company web server 504 is the company web server 104, the experiment server 506 is the experiment server 116, and the tracking server 508 is the tracking server 118.

The end user using the end user computer 502 having a web browser navigates to a landing page with the landing page experiment on the company web server 504. As the landing page is returned and displayed in the web browser, the web browser executes the experiment code and sends information about the web browser to the experiment server 506 and requests content from the experiment server 506. The experiment server 506 uses the web browser information and historical data about the experiment from the statistics database 218, determines the variations of content for each region defined in the experiment and returns the content to be displayed in the landing page to the web browser. A unique identifier is returned for each trial in the experiment. The web browser dynamically creates the web page based on the landing page downloaded and the experiment content retrieved by hiding existing content in experiment regions and then replacing the existing content with the content retrieved from the experiment server. In one embodiment, the experiment code displays the original version of the web page if the experiment server is inaccessible or if JavaScript is disabled in the web browser. The experiment code also sets a cookie with the unique identifier on the end user computer 502 for the trial so that subsequent visits from the same user on the same end user computer 502 will display the exact same dynamically created landing page until the experiment concludes. When the page is rendered, the tracking code sends information about the landing page and user to the tracking server 508.

When the user views the landing page or any other web pages with the tracking code, the web browser sends the landing page and tracking data to the tracking server 222 and stores it in the statistics database 218. The analytics server 224 aggregates statistics on page views, conversions and other metrics, as defined in the landing page and conversion database 214, and stores it in the statistics database 218. The analytics server 224 associates conversions with the different versions of the landing page displayed based on a variety of criteria including ensuring the same user from the same computer viewed the page, and that the landing page was the most recently viewed version of the landing page (if for any reason different versions were viewed by a single user, for example, if the user deleted a cookie) viewed prior to the conversion. In one embodiment, conversions are allocated only to landing pages viewed during the same visit. In one embodiment, multiple landing pages can be credited with generating the conversion, either allocating the conversion in entirety to multiple landing pages or allocating the conversion in part to each of the landing pages based on a variety of criteria. In one embodiment, each conversion can be credited to multiple landing page optimization experiments which are being run simultaneously. Based on the data in the statistics database 218, the experiment server 220 refines the landing page optimization experiment, specifically the variations and frequency of content it renders to end users. In one embodiment, the system displays the content that drives more conversions more frequently than it displays less effective content.

Figure 6:
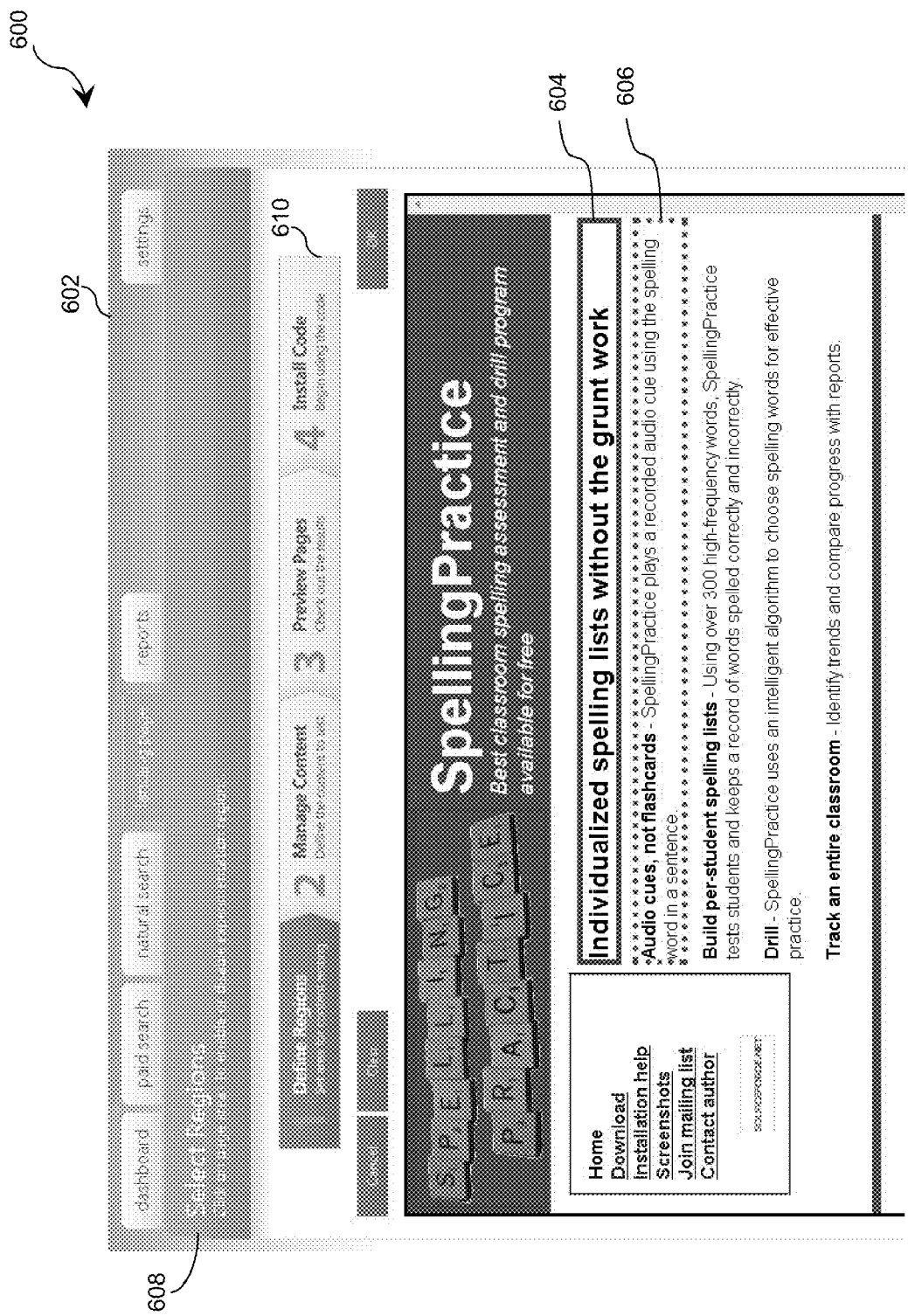
FIG. 6 illustrates a display to select regions of a landing page in accordance with one embodiment of the present invention.

FIGS. 6, 7, 7A, and 8 illustrate exemplary screens of the wizard, as discussed above, in connection with, for example, FIG. 4A. A first exemplary screen 600 of the allow visual configuration of the landing page block 316 to select regions of a landing page and, in particular, the Define Regions block 452, is shown in FIG. 6. The exemplary screen 600 of the visually configure landing page block 316 includes an embedded web page control 602, a selected content indicator 604, a cursor indicator 606, a wizard header 608 and a wizard progress bar 610.

The wizard header 608 displays the title and a description of the currently selected step of the step-by-step wizard. The wizard progress bar 610 shows the current step, highlighted, in the context of all the steps in the step-by-step wizard. The embedded web page control 602 is displayed within a configuration page and displays the landing page being optimized. The selected content indicator 604 highlights the regions that have been selected for experimentation. The cursor indicator 606 indicates the current region that the user is hovering the mouse or pointer over for possible selection.

Figure 7:
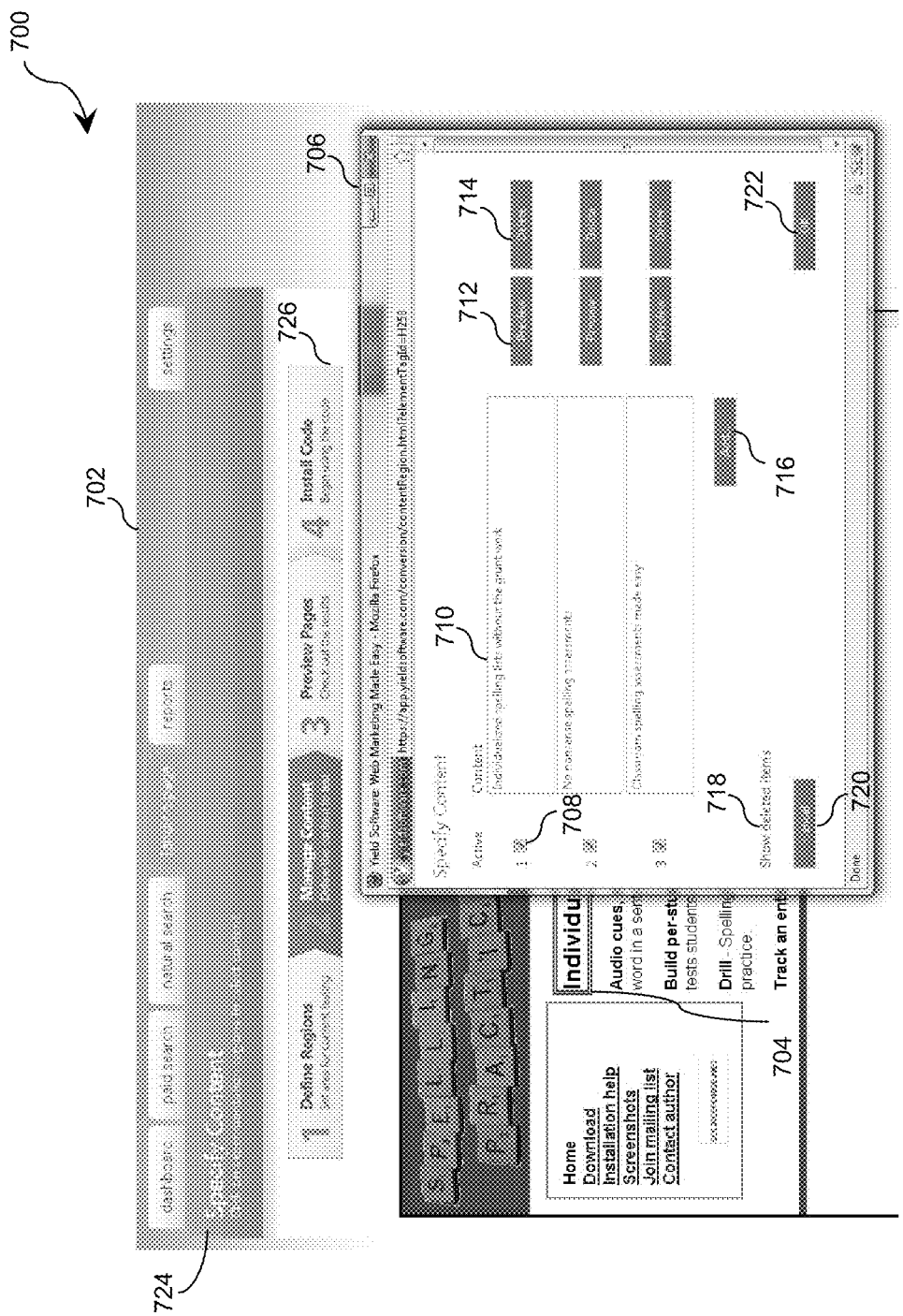
FIG. 7 illustrates a display to manage content for a region in accordance with one embodiment of the present invention.

A second exemplary screen 700 of the allow visual configuration of the landing page block 316 to specify content variations for a region and, in particular, the Manage Content block 454, is shown in FIG. 7. The exemplary screen 700 of the visually configure landing page block 316 includes an embedded web page control 702, a selected region indicator 704, a specify content pop-up window 706, an active checkbox 708, a content entry field 710, a preview button 712, a delete button 714, an add button 716, a show deleted items link 718, a cancel button 720, an ok button 722, a wizard header 724 and a wizard progress bar 726.

The wizard header 724 displays the title and a description of the currently selected step of the step-by-step wizard. The wizard progress bar 726 shows the current step, highlighted, in the context of all the steps in the step-by-step wizard.

The web page control 702 is displayed within a configuration page and displays the landing page being optimized. The selected content indicator 704 highlights the regions that have been selected for experimentation. The specify content pop-up window 706 displays the original content for a single region and all variations of content configured by the administrator. The active checkbox 708 allows an administrator to enable or disable variations of content to be used in the experiment. The content entry field 710 enables a user to create or edit variations of content to be used in the experiment. In one embodiment, the content is text or an HTML reference to an image or graphic. The preview button 712 enables a user to preview the web page in the web page control 702 with the content in the content entry field 710 replacing the original content in the appropriate region. The delete button 714 enables a user to delete the content from the experiment. In one embodiment, the content is soft-deleted and may be enabled at a later date.

The add button 716 enables a user to add additional content variations. Clicking on the add button creates a new active checkbox 708, content entry field 710, preview button 712 and delete button 714 for the new content. The show deleted items link 718 displays all the content for the region, including content that had been previously deleted. When deleted items are shown, the link changes to "Hide deleted items" and when selected hides the deleted content. The cancel button 720 closes the specify content pop-up window 706 ignoring all changes that have been made. The ok button closes the specify content pop-up window 706 saving all changes that have been made.

Figure 7A:
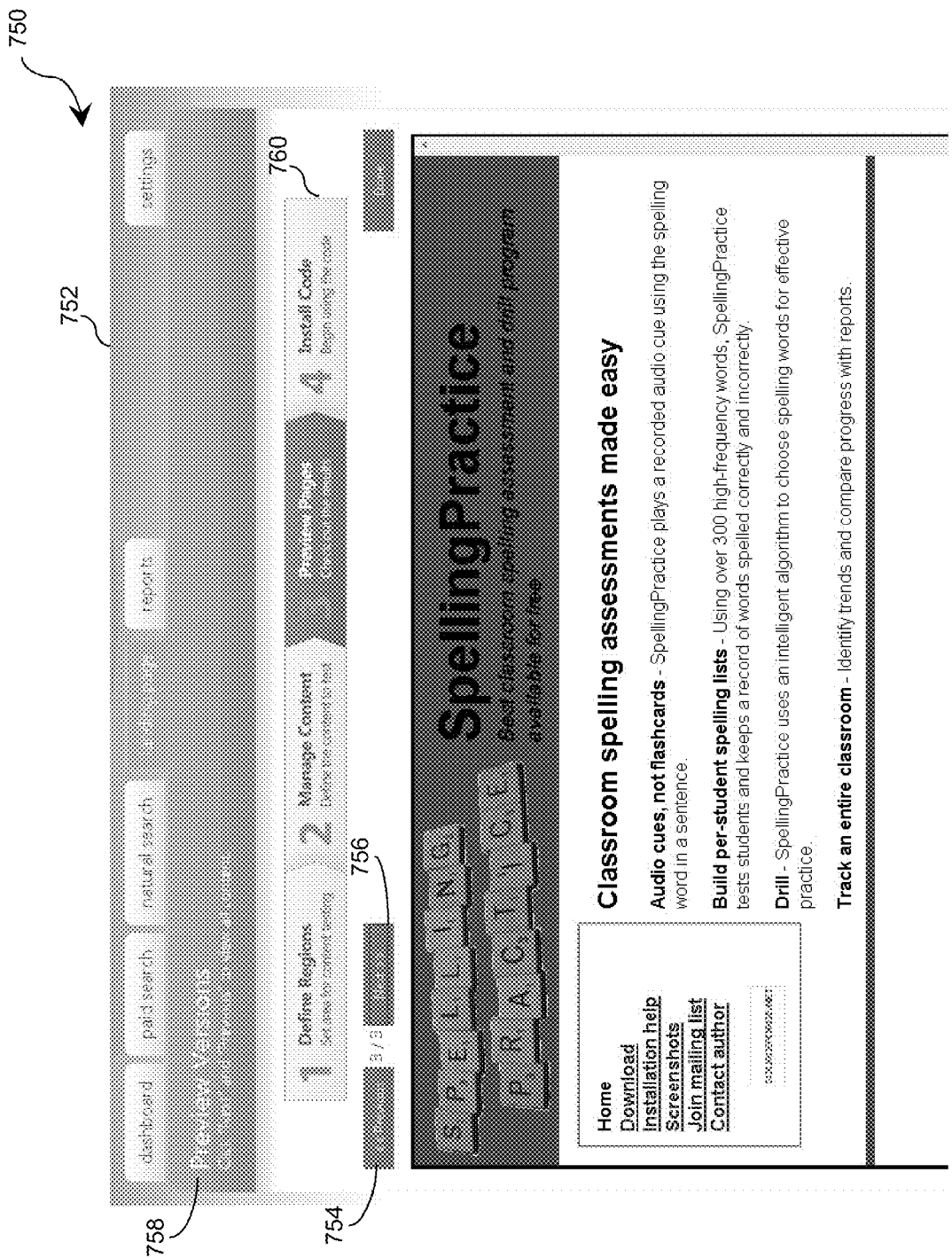
FIG. 7A illustrates a display to preview a configured landing page in accordance with one embodiment of the present invention.

An exemplary screen 750 of the provide capability to preview landing pages block 320 to provide landing page previews and, in particular, the Preview Pages block 456 is shown in FIG. 7A. The exemplary screen 750 of the provide capability to preview landing pages block 320 includes an embedded web page control 752, a previous button 754, a next button 756, a wizard header 758 and a wizard progress bar 760. The wizard header 758 displays the title and a description of the currently selected step of the step-by-step wizard. The wizard progress bar 760 shows the current step, highlighted, in the context of all the steps in the step-by-step wizard. The web page control 752 is displayed within a preview page and displays the landing page being optimized. The original version of the landing page is displayed. Each time the administrator using the administrator computer 202 clicks on the previous button 754, a version of the web page showing different variations of content for each region is displayed. When the administrator using the administrator 202 clicks on the next button 756, the next version of the web page showing different variations of content for each region is displayed.

Figure 8:
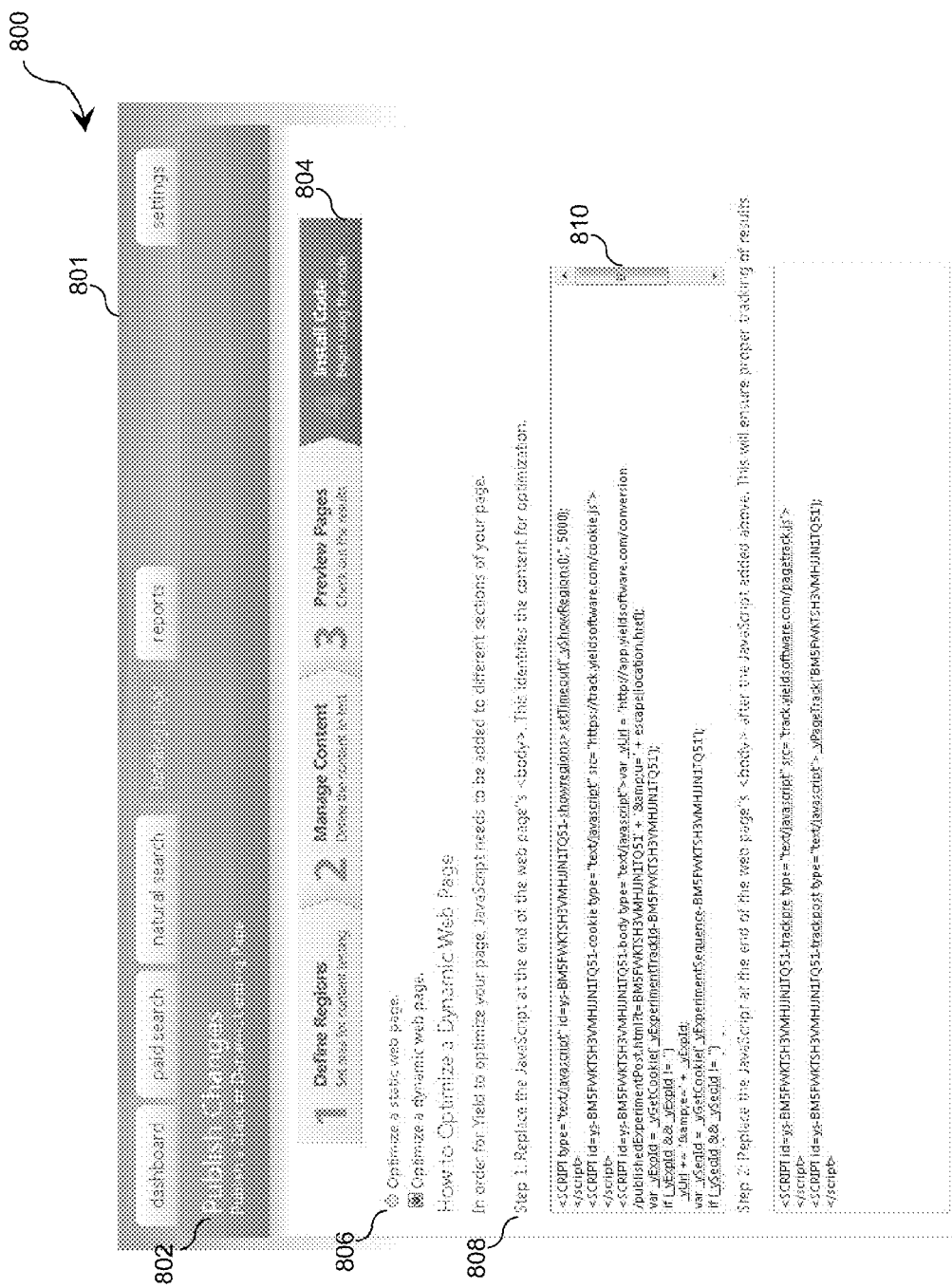
FIG. 8 illustrates a display to publish an experiment in accordance with one embodiment of the present invention.

An exemplary screen 800 of the display step-by-step landing page modification instructions 422 and, in particular, the Install Code block 458 is shown in FIG. 8. The exemplary screen 800 of the display step-by-step landing page modification instructions 422 includes a wizard header 802, a wizard progress bar 804, a deployment type radio button 806, step instructions 808, and a web page code field 810.

The wizard header 802 displays the title and a description of the currently selected step of the step-by-step wizard. The wizard progress bar 804 shows the current step, highlighted, in the context of all the steps in the step-by-step wizard. The deployment type radio button 806 allows the administrator to select whether the user wants to see instructions to implement the landing page experiment (as shown) or whether the administrator wants to have the system create a version of the landing page with the experiment implemented. In one embodiment, a download file button (not shown) can enable the user to email either the instructions or the landing page with the experiment implemented to an email recipient. The step instructions 808 indicate the step number and easy-to-follow instructions for each step in modifying a landing page. The web page code 810 is a selectable field that allows the user to copy the content and paste it into the landing page in the location specified by the step instructions 808.

Figure 9:
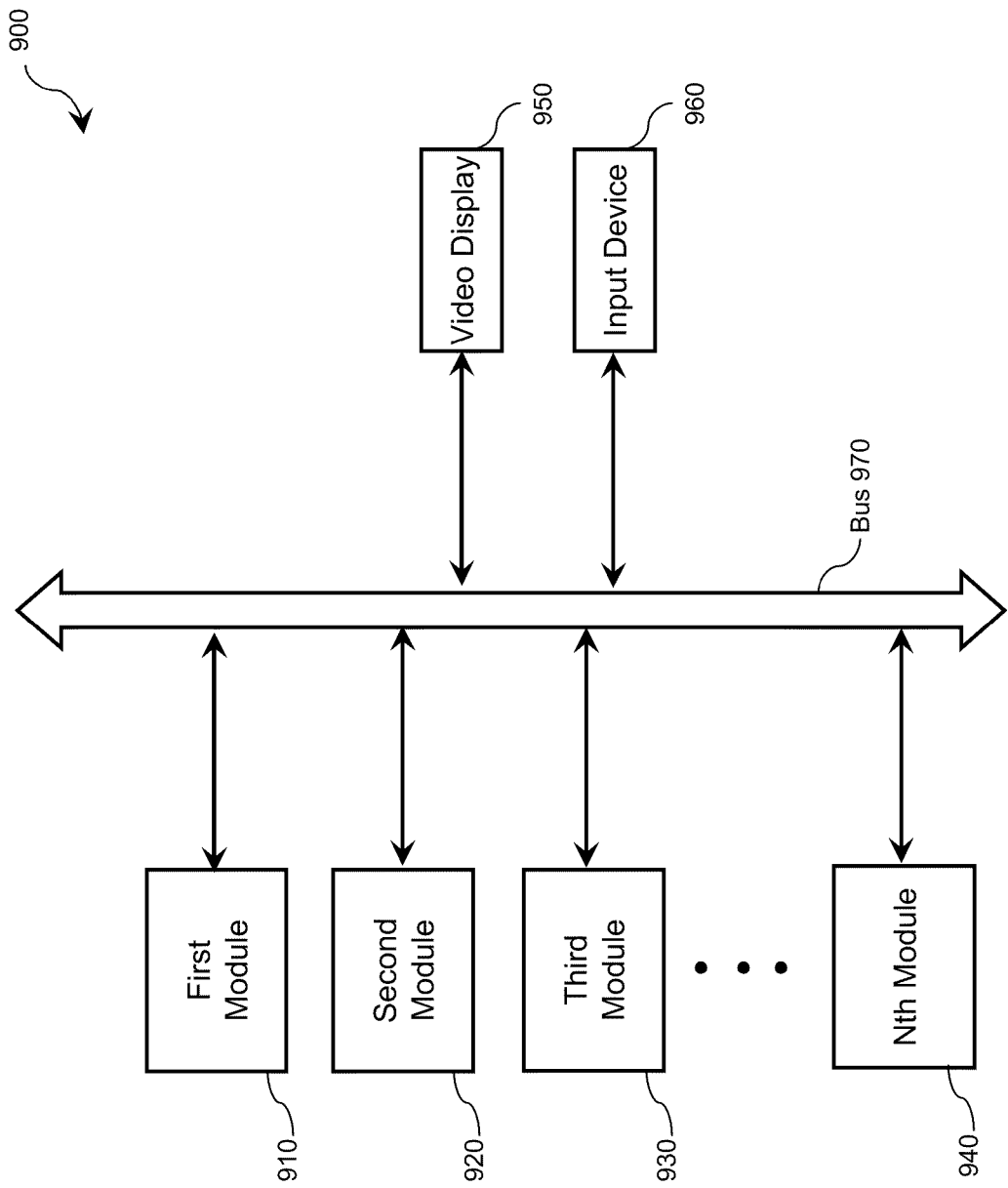
FIG. 9 illustrates a block diagram of one embodiment of a system in accordance with one embodiment of the present invention.

FIG. 9 illustrates a block diagram of one embodiment of a system 900 of the present invention. The system 900 includes a first module 910, a second module 920, a third module 930, an Nth module 940, a video display 950, and an input device 960 coupled together through a bus 970. As illustrated, the system 900 includes the modules 910, 920, 930, 940 in one embodiment. In one embodiment, any number of modules can be implemented.

In one embodiment, the routines, steps, and functional blocks executed to implement the embodiments of the disclosure and all of the aforementioned features of the present invention may be variously implemented as computer modules 910, 920, 930, 940. In one embodiment, these computer modules can be a sequence of instructions referred to as "computer programs."

In one embodiment, user input is provided to one or more of the modules using an input device 960. The input device 960 may be a keyboard, cursor control device, or voice recognition system, for example. In another embodiment, more than one input device may be used. In one embodiment, module output is displayed using a video display 950.

Figure 10:
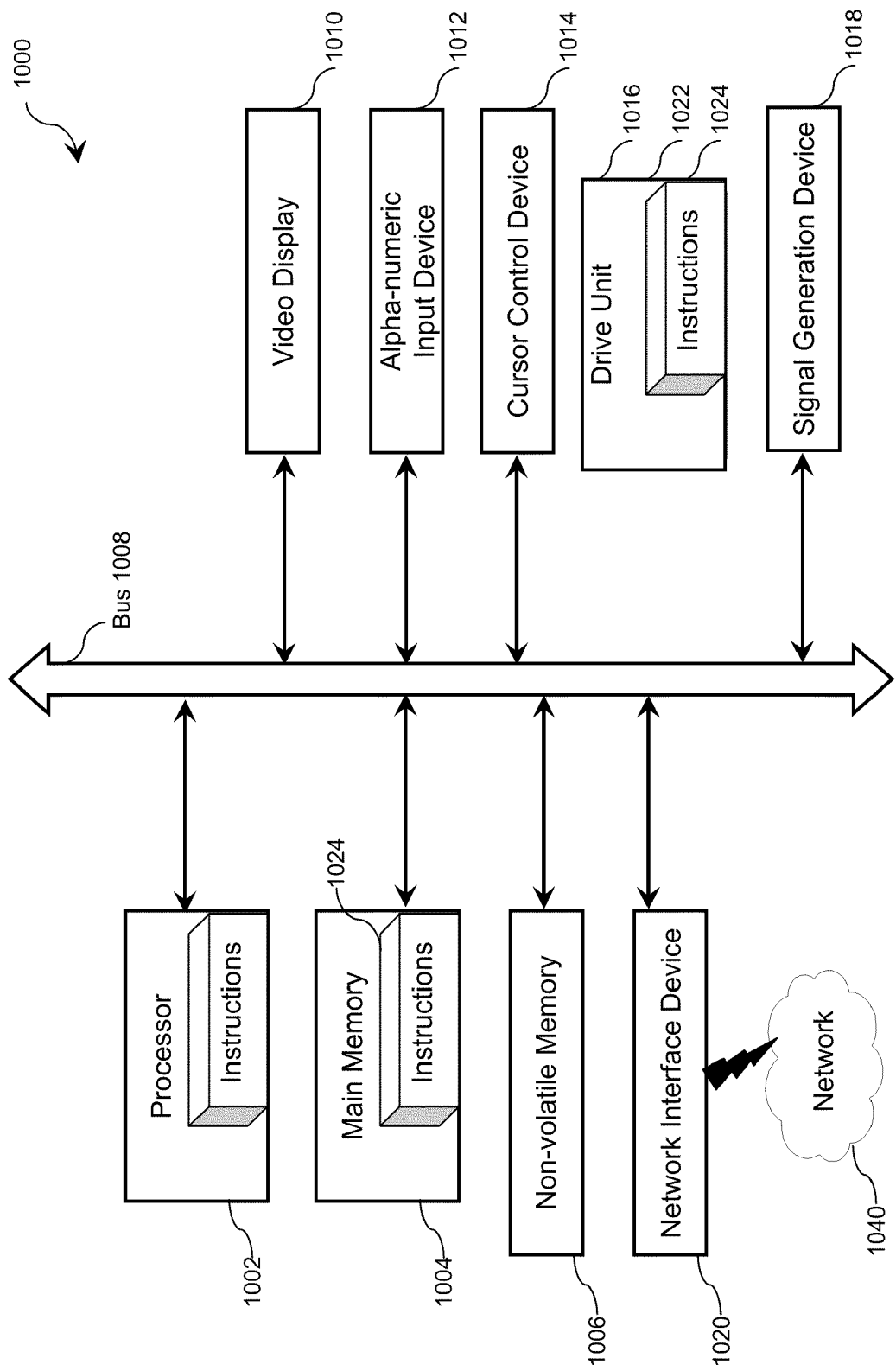
FIG. 10 shows a diagrammatic representation of a machine in an exemplary form of a computer system in accordance with one embodiment of the present invention.

FIG. 10 shows a diagrammatic representation of a machine in an exemplary form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The computer system 1000 includes a processor 1002 (e.g., a central processing unit (CPU), a graphics processing unit (GPU), or both), a main memory 1004 and a nonvolatile memory 1006, which communicate with each other via a bus 1008. In some embodiments, the computer system 1000 may be a laptop computer, personal digital assistant (PDA) or mobile phone, for example. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020. The disk drive unit 1016 includes a machine-readable medium (or computer readable medium) 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media. The software 1024 may further be transmitted or received over a network 1040 via the network interface device 1020.

While the machine-readable medium (computer readable medium) 1022 is shown in an exemplary embodiment to be a single medium, the term "machine-readable medium" or "computer readable medium" should be taken to include a single medium or multiple media (e.g., a centralized or distributed database, and/or associated caches and servers).

An embodiment of the invention relates to a computer storage product with a computer-readable or machine-accessible medium having executable instructions or computer code thereon for performing various computer-implemented operations. The term "computer-readable medium" or "machine-accessible medium" is used herein to include any medium that is capable of storing or encoding a sequence of executable instructions or computer code for performing the operations described herein. The media and computer code can be those specially designed and constructed for the purposes of the invention, or can be of the kind well known and available to those having ordinary skill in the computer software arts.

Examples of computer-readable media include computer-readable storage media such as: magnetic media such as hard disks, floppy disks, and magnetic tape; optical media such as Compact Disc-Read Only Memories ("CD-ROMs"), DVDs, and holographic devices; magneto-optical media such as optical disks; and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Another embodiment of the invention can be implemented in hard wired circuitry in place of, or in combination with, computer code.

In general, the routines, steps, and functional blocks executed to implement the embodiments of the disclosure and aforementioned features of the present invention may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or reordered to form an equivalent method without departing from the teachings of the invention. Accordingly, unless specifically indicated herein, the order and grouping of the operations is not a limitation of the invention.

The invention claimed is:

1. A computer implemented method to visually configure a landing page optimization experiment comprising:
providing, using a computing device, a utility to an administrator computer used by an administrator for configuring an optimization experiment on a landing page selected by the administrator;
reading, using the computing device, the landing page; and
processing, using the computing device, the landing page to allow the administrator to configure the optimization experiment without writing code.

2. The method of claim 1 further comprising:
parsing code of the landing page; and
standardizing the code of the landing page.

3. The method of claim 1 further comprising providing a wizard to the administrator computer to configure and publish the optimization experiment of the landing page.

4. The method of claim 3 wherein the utility includes the wizard.

5. The method of claim 3 wherein the wizard provides at least one first screen to allow definition of regions in the landing page to display variations of content.

6. The method of claim 5 wherein the wizard provides at least one second screen to allow management of the variations of content to be used in the regions.

7. The method of claim 6 wherein the wizard provides at least one third screen to display a preview of the landing page before publication to an end user.

8. The method of claim 7 wherein the wizard provides at least one fourth screen to allow publication of the landing page by at least one of the following: downloading the landing page, emailing the landing page, displaying step-by-step landing page modification instructions, and emailing step-by-step landing page modification instructions.

9. A computer implemented method to visually configure a landing page optimization experiment comprising:
providing, using a computing device, a utility to an administrator computer used by an administrator for configuring an optimization experiment on a landing page selected by the administrator;
reading, using the computing device, the landing page;
processing, using the computing device, the landing page to allow the administrator to configure the optimization experiment without writing code;
parsing, using the computing device, code of the landing page;
standardizing, using the computing device, the code of the landing page;
identifying, using the computing device, experiment code associated with the landing page; and
removing, using the computing device, existing experiment code previously added to the landing page.

10. The method of claim 9 further comprising:
modifying the landing page to enable visual manipulation of the landing page.

11. The method of claim 10, wherein the modifying includes generating element ids and inserting the element ids into the landing page.

12. The method of claim 11, further comprising allowing the administrator to visually configure the optimization experiment with variations of content by using at least one input technique from the group consisting of: dragging, dropping, pointing, and clicking.

13. The method of claim 12, further comprising eliminating the need for the administrator to manually write code to configure the optimization experiment.

14. The method of claim 13 further comprising providing the landing page to the administrator computer for display in a graphical user interface as a preview before publication.

15. The method of claim 11 further comprising allowing the administrator to publish the landing page.

16. A computer implemented method to visually configure a landing page optimization experiment comprising:
   providing, using a computing device, a utility to an administrator computer used by an administrator for configuring an optimization experiment on a landing page selected by the administrator;
   reading, using the computing device, the landing page;
   processing, using the computing device, the landing page to allow the administrator to configure the optimization experiment without writing code;
   receiving, using the computing device, tracking data generated by the tracking code after the landing page is rendered on an end user computer; and
   storing, using the computing device, the tracking data.

17. The method of claim 16 further comprising removing existing experiment code previously added to the landing page.

18. The method of claim 16 further comprising modifying the landing page to enable visual manipulation of the landing page.

19. The method of claim 18 wherein the modifying includes generating element ids and inserting the element ids into the landing page.

20. The method of claim 16 further comprising allowing the administrator to visually configure the optimization experiment with variations of content by using at least one input technique from the group consisting of: dragging, dropping, pointing, and clicking.

21. The method of claim 16 further comprising providing the landing page to the administrator computer for display in a graphical user interface as a preview before publication.

22. The method of claim 16 further comprising providing a wizard to the administrator computer to configure and publish the optimization experiment of the landing page.

23. The method of claim 22 wherein the utility includes the wizard.

24. The method of claim 22 wherein the wizard presents at least one of a first screen to allow definition of regions in the landing page to display variations of content, a second screen to allow management of the variations of content to be used in the regions, a third screen to display a preview of the landing page before publication to an end user, and a fourth screen to allow publication of the landing page.

25. The method of claim 16 further comprising employing statistical data to select content for display on the landing page.

26. A computer implemented method to visually configure a landing page optimization experiment comprising:
   providing, using a computing device, a utility to an administrator computer used by an administrator for configuring an optimization experiment on a landing page selected by the administrator;
   reading, using the computing device, the landing page;
   processing, using the computing device, the landing page to allow the administrator to configure the optimization experiment without writing code; and
   aggregating, using the computing device, statistical data to determine correlations between variations of content for the landing page and resulting conversions, the statistical data relating to at least one of impressions, conversions, and conversion rates of the landing page.

27. The method of claim 26 further comprising employing the statistical data to select the content for display on the landing page.

28. The method of claim 26 further comprising removing existing experiment code previously added to the landing page.

29. The method of claim 26 further comprising modifying the landing page to enable visual manipulation of the landing page.

30. The method of claim 26 further comprising allowing the administrator to visually configure the optimization experiment with the variations of content by using at least one input technique from the group consisting of: dragging, dropping, pointing, and clicking.

31. The method of claim 26 further comprising providing the landing page to the administrator computer for display in a graphical user interface as a preview before publication.

32. The method of claim 26 further comprising providing a wizard to the administrator computer to configure and publish the optimization experiment of the landing page.

33. The method of claim 32 wherein the wizard presents at least one of a first screen to allow definition of regions in the landing page to display variations of content, a second screen to allow management of the variations of content to be used in the regions, a third screen to display a preview of the landing page before publication to an end user, and a fourth screen to allow publication of the landing page.

34. A system comprising: at least one processor; and
   a memory storing instructions configured to instruct the at least one processor to:
      provide a utility to an administrator computer used by an administrator for visually configuring an optimization experiment on a landing page;
      read the landing page selected by the administrator; and
      process the landing page to allow the administrator to configure the optimization experiment without writing code.

35. A machine-readable medium having stored thereon a set of instructions, which when executed by a machine, perform a method comprising:
   providing a utility to an administrator computer used by an administrator for visually configuring an optimization experiment on a landing page;
   reading the landing page selected by the administrator; and
   processing the landing page to allow the administrator to configure the optimization experiment without writing code.

* * * * *